United States Patent [19]

Goodhue et al.

[11] 3,909,359

[45] Sept. 30, 1975

[54] METHOD FOR THE PREPARATION OF CHOLESTEROL OXIDASE

[75] Inventors: Charles T. Goodhue; Hugh A. Risley, both of Rochester, N.Y.

[73] Assignee: Eastman Kodak Company, Rochester, N.Y.

[22] Filed: Mar. 25, 1974

[21] Appl. No.: 454,658

[52] U.S. Cl. ................................ 195; 195/66 R
[51] Int. Cl.² .................................... C12D 13/10
[58] Field of Search .......................... 195/65, 66

[56] References Cited
UNITED STATES PATENTS
3,776,816  12/1973  Terada et al. ................. 195/66 R

*Primary Examiner*—Lionel M. Shapiro
*Attorney, Agent, or Firm*—A. L. Girard

[57] ABSTRACT

A novel method for the production of cholesterol oxidase comprising the steps of (a) growing the bacterium *Nocardia cholesterolicum* species NRRL 5767 or NRRL 5768 in a medium in which cholesterol or a suitable derivative thereof serves as an auxiliary source of carbon; and (b) isolating from said mixture, a cell-free extract containing the active enzyme.

9 Claims, 1 Drawing Figure

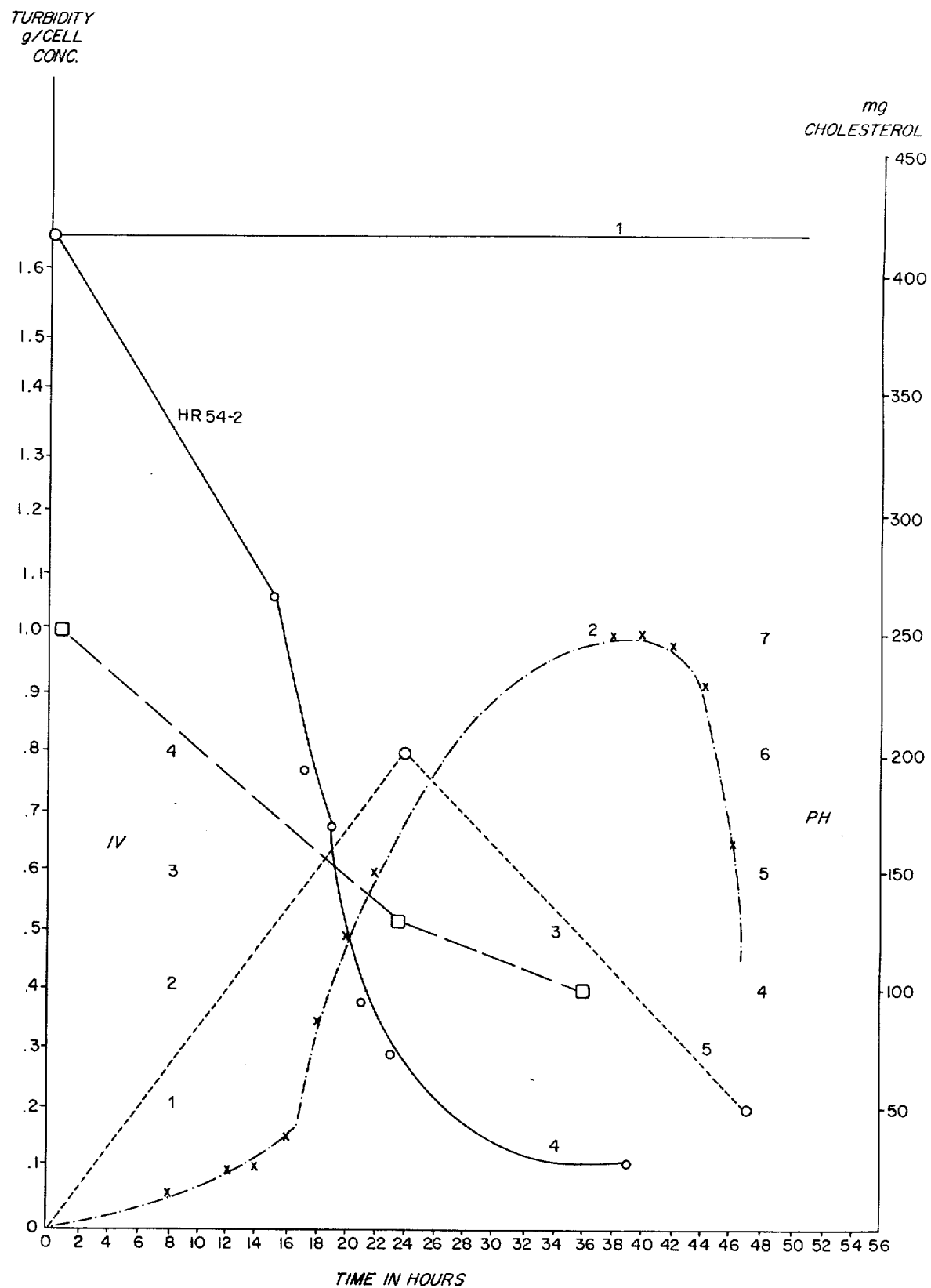

METHOD FOR THE PREPARATION OF CHOLESTEROL OXIDASE

FIELD OF THE INVENTION

The present invention relates to a novel method for the synthesis of cholesterol oxidase.

BACKGROUND OF THE INVENTION

Microorganisms capable of metabolizing cholesterol are potential sources of enzymes useful in an enzymatic assay of cholesterol in complex mixtures such as blood serum, etc. This is particularly so if the microorganisms can use cholesterol as a sole carbon source, for in this metabolic process cholesterol must be degraded by oxidative enzymes.

Stadtman, T. C., *Methods in Enzymology*, Vol. 1, Colowick, S. P. and Kaplan, N. O., Eds. Academic Press, N.Y. 1955, P. 678 and Stadtman, T. C., Cherkes, A. and Anfinsen, J., *Biol. Chem.*, 206,511 (1954) reported the preliminary purification of an enzyme from *Nocardia cholesterolicum*, an organism originally isolated by Schatz et al. (Schatz, A. Savard, K., and Pintner, I. J., J. Bacteriol., 58, 117–125 (1949). Stadtman's enzyme, "cholesterol dehydrogenase," was purified sufficiently for use in a cholesterol assay based on the measurement of the increase in absorbance at 240 nm owing to the formation of cholest-4-ene-3-one. Since as we have now determined, the direct acceptor of cholesterol electrons in this oxidation is oxygen, the enzyme should properly be called cholesterol oxidase according to current convention.

The bacterial strains described by Stadtman when cultured as described in the aforementioned references produce very low enzyme levels which are not practical for commercial operations. These levels are sufficiently low that purification of the enzyme is a very remote possibility for achieving a commercial operation.

OBJECTS OF THE INVENTION

It is therefore an object of the present invention to provide an improved process for preparing large quantities of cells of *Nocardia cholesterolicum* having a high level of cholesterol oxidase activity.

SUMMARY OF THE INVENTION

Achievement of the foregoing object, and several spin-off advantages described hereinafter, are accomplished by growing the bacterium *Nocardia cholestericum* in a medium which includes cholesterol or a suitable derivative thereof as an auxiliary carbon source. Once grown, conventional isolation techniques can be used to extract the enzyme from the bacterial cells and the culture medium. Specifically preferred embodiments of the instant invention include the use of: (1) carbon sources which act concurrently as enzyme inducers; and (2) suspension of the enzyme inducer of (1) and the substrate in a mixture of water and a second miscible liquid.

Among the advantages obtained with the instant process, in addition to those inherent in a more efficient process, are that the process described herein: (a) can be carried out in conventional fermentation equipment; (b) permits the production of stable, cell-free systems containing the active enzyme; (c) induces enzyme formation to levels of about 100 times greater than previously achieved in the aforementioned prior art; and (d) yields a preparation which is very stable (for periods of at least 1 year) and can be frozen or thawed with no apparent loss of activity.

FIG. I is a graph showing the growth kinetics of the method of the present invention.

DETAILED DESCRIPTION OF THE INVENTION

According to the cell preparation techniques described by Stadtman in the aforementioned references, the culture medium contained an ammonia source, preferably ammonium sulfate, a potassium and phosphorus source, preferably $K_2HPO_4$, trace metal ions necessary for metabolism and glycerol as a carbon source. The pH of the medium was maintained at between 5.0 and 8.0. The cultures were incubated for 18–40 hours at 24°–35°C with vigorous aeration.

It has now unexpectedly been found that a variety of techniques can be used to increase the yield of cholesterol oxidase obtained from *Nocardia cholesterolicum* in a preparation of the type just described.

Two *Nocardia cholesterolicum* cultures which yield cholesterol oxidase are characterized as the "rough" and "smooth" strains and are called NRRL 5767 and NRRL 5768 respectively based on their deposit with the Agricultural Collection Investigations Fermentation Laboratory, Peoria, Illinois.

Complete details of the organisms are as follows:

DESCRIPTION OF NOCARDIA CHOLESTEROLICUM

I. Cellular Morphology.

A. Smooth strain. Gram positive weakly acid-fast, coryneform, no well-developed mycelia, but rudimentary branching observed. Coccoid forms appear in older cultures.

B. Rough strain. Same as above.

II. Colonial Morphology.

A. Nutrient agar (5 days, 30°C).
  1. Smooth strain. circular, convex, watery, entire, smooth, glistening, pink-white. No soluble pigment.
  2. Rough strain. circular, convex, entire, smooth to rough, pink-white. No soluble pigment.
B. Yeast glucose agar (5 days, 30°C).
  1. Smooth strain. cream to tan-colored, watery, smooth, round, and elevated.
  2. Rough strain. dry, cream to tan-colored, round, and elevated.
C. Casein agar (5 days, 30°C).
  1. Smooth strain. cream to tan-colored, watery, round, smooth, elevated.
  2. Rough colony. Tan to pink, dry, elevated.
D. Gelatin agar.
  1. Smooth strain. circular, convex, entire, smooth, watery, cream-colored.
  2. Rough strain. circular, convex, entire, dry, cream-colored.

III. Growth in Liquid Culture (Nutrient Broth, 5 Days, 30°C).

A. Smooth strain. off-white to tan flock-forming precipitate, no pellicle

B. Rough strain. off-white to tan flock-forming precipitate, no pellicle.

IV. Physiology (Smooth and Rough Strains Identical)

| | |
|---|---|
| Aeration | aerobic |
| Gelatin hydrolysis | − |
| Casein hydrolysis | − |
| Starch hydrolysis | − |
| Oxidase | − |
| Catalase | + |
| Urease | − |
| Indole | − |
| Methyl red | − |
| Phenylalanine deamination | − |
| Litmus milk | alkaline |
| Use of compounds as sole carbon | |
| Citrate | + |
| Lactate | + |
| Malate | + |
| Succinate | + |
| Fructose | + |
| Glucose | + |
| Sucrose | + |
| Maltose | + |
| Glycerol | + |
| Sorbitol | + |
| Trehalose | + |
| Raffinose | − |
| Dulcitol | − |
| Lactose | − |
| Mannitol | + |
| Starch | − |
| Arabinose | − |

The first modification of the aforementioned Stadtman technique, which resulted in substantial and unexpected increases in the yield of cholesterol oxidase, as demonstrated in the examples below, was the use of a principle carbon source such as glycerol and, as an auxiliary carbon source, cholesterol or a derivative of cholesterol selected from the group consisting of cholest-4-ene-3-one and cholesteryl linoleate. It has been discovered that these latter materials not only serve as auxiliary carbon sources, but also simultaneously act as enzyme inducers which substantially increase the quantity of enzyme produced by the culture.

According to the method of the present invention, the use of a conventional primary carbon source such as glycerol, in combination with a secondary or auxiliary carbon source such as cholesterol, cholest-4-ene-3-one, or cholesteryl linoleate which also simultaneously acts as an enzyme inducer increases the yield of cholesterol oxidase enzyme to levels about 100 times higher than those produced when an auxiliary carbon source is not used or cholesterol is used as the sole carbon source as described in the prior art.

Thus, in a preferred embodiment of the invention, the bacterium is grown in a conventional nutrient medium of the type well known in the art which generally comprises a nitrogen source such as ammonium sulfate, a potassium and a phosphorus source such as potassium phosphate, trace metal ions, and a mixture of a primary carbon source such as glycerol and a secondary carbon source selected from the group consisting of cholesterol, cholest-4-ene-3-one, cholesterol linoleate, and mixtures thereof. The pH value of the medium is maintained between about 5.0 and 8.0, preferably between about 6.5 and 7.5, at a temperature of from about 25° to about 35°C, preferably about 30°C, for a period of from about 18 to about 40 hours, preferably for from about 20 to about 24 hours.

The quantities of nitrogen, potassium phosphorus and trace metal ions used in the culture are those conventionally used in processes of this type and are well known to those skilled in the art. Specifically, those described in the aforementioned references provide useful levels of these constituents.

Among the primary carbon sources which are useful in the successful practice of the invention are glycerol, glucose, and acetic acid. Conventional concentrations of primary carbon source are used. These generally range from about 0.5% to about 5% by weight. The concentration of the secondary carbon source-inducer utilized, generally ranges from about 0.05% to about 0.5% by weight. A preferred range of secondary carbon source is from about 0.1% to about 0.2% by weight.

According to a preferred embodiment of the invention, the secondary carbon source-inducer is suspended in water to yield further improved results. Using this technique involves either directly suspending the inducer-carbon source in water using vigorous agitation or some similar suspension technique, or first dissolving the inducer-carbon source in a water-miscible solvent and subsequently vigorously mixing the inducer-carbon source solution with water to suspend the inducer-carbon source. The particular solvent used to dissolve the inducer-carbon source appears to be of little importance so long as it is miscible with water, dissolves the inducer-carbon source, and does not inhibit enzyme production or activity. As shown in the Examples below, low molecular weight alcohols, and ethers, e.g. methanol, ethanol, etc., low and medium viscosity poly(vinyl) alcohols, have all proven to be very useful solvents, however, almost any organic solvent which meets the aforementioned requirements will be satisfactory.

Alternatively, suspension of the inducer-carbon-source can be achieved using a surfactant at a level sufficient to produce a stable suspension of the inducer. A particularly preferred class of surfactants for this purpose are the polyoxyethylene glycol sorbitan monoesters manufactured by Atlas Chemical Industries under the tradename "Tween." Other useful surfactants include the phenoxy polyethoxy ethylene surfactants available from Olin Mathieson under the tradenames Surfactant 6G and, 10G and, Renex materials available from ICI America Inc. bile steroids and polyethylene glycol, however, any surfactant which does not inhibit enzyme production or activity could be used for this purpose. Concentration of surfactant ranging between about 0.01 and 0.20% and preferably about 0.05% are considered satisfactory for this purpose. As will be shown in Example 7 below, surfactant concentrations above this level appear to inhibit enzyme formation.

Increased yields in cells may, of course, be attained by optimized aeration and constant agitation. An aeration rate of from about 0.25 to about 0.5 VVM (volume of air per volume of medium per minute) and a moderate agitation speed will generally produce optimum growth.

In case the initial inoculum of the microorganism into the culture medium is low, a delay phase of from about 8 to about 20 hours may occur. The delay is a function of the inoculum size and little or no delay is experienced when the amount of material injected is greater than 5% of the expected total cell weight at completion of the preparation cycle.

The enzyme preparation may be maintained in liquid or solid form, for example, in a freeze-dried or lyophilized state. When maintained in the solid state, it should be dissolved in a buffer solution prior to use in cholesterol assay techniques.

The enzyme produced according to the procedures described herein demonstrates a highly specific cholesterol oxidase activity of at least 1 unit per mg of protein nitrogen, and can be produced by purification to demonstrate activities of up to at least about 20 units per mg of protein nitrogen.

Isolation of the intracellular enzyme can be achieved using any of the techniques well known in the art.

The cells may be harvested by conventional centrifuging or filtration techniques. It can be shown that the cells themselves have a cholesterol oxidase activity with a typical, specific activity of the cells of the rough strain of approximately 10 U/g (dry weight).

A unit of cholesterol oxidase is defined, for purposes of this invention, as that amount of cholesterol oxidase which converts 1 $\mu$ mole of cholesterol to hydrogen peroxide and cholest-4-ene-3-one in 1 minute at 37°C and pH 7.

The intracellular cholesterol oxidase may be extracted from the harvested cells by breaking open the cells and removal of the cell fragments, as is conventional in enzyme manufacture.

A convenient method for cell breaking is by treatment with a sonifier such as Branson Model S75 for 10 minutes, 100 watts, at 5°–10°C. A Gaulin homogenizer is also suitable for cell breaking to free the intracellular enzyme.

A preferred method for breaking the cells is by means of sonic treatment. Alternatively, as is demonstrated in Example 9 below, at least some of the enzyme activity can be unmasked by freezing and thawing the centrifuged cells.

Broken cells are collected by centrifugation. Most of the cholesterol oxidase sediments with the broken cells and cell debris. Enzyme can be solubilized from this sediment by treatment either with deoxycholate or an octyl phenoxy polyethoxy ethanol solution. Suitable methods for purification of enzyme preparations obtained as a result of extraction of cell debris with surface-active agents comprise the precipitation with ammonium sulfate and/or chromatographic methods and/or concentration by ultrafiltration. Such procedures also remove the contaminating enzyme, catalase. For example, the preparation may be concentrated by precipitation with ammonium sulfate and freed from salt on a column of a 3-dimensionally cross-linked polysaccharide (tradename Sephadex), and may then be subjected to an ion-exchange chromatography. In this step it is possible to increase the activity of the preparation approximately 15 to 40 times.

Preferably, the enzyme preparation is subjected first to an ion-exchange chromatography, preferably a chromatography with the aid of DEAE or TEAE-cellulose (slightly basic anion exchanger with a diethylaminoethyl or triethylaminoethyl-group on a functional group of a 3-dimensionally crosslinked polysaccharide), or CM-cellulose (slightly acid cation exchanger with a carboxymethyl-functional group on a 3-dimensionally crosslinked polymer), and may then be concentrated as a result of ultrafiltration.

A preferred purification technique using sonification, centrifugation and extraction of the 27,000 G pellet with the surfactant deoxycholate is described in detail in Example 10 although any conventional purification technique as described hereinabove is suitable.

The following examples will serve to better illustrate the practice and advantages of the present invention.

Except as specified, all studies described in these examples were done with the rough strain.

EXAMPLE 1:

Maintenance of Culture

The two strains of *Nocardia cholesterolicum* were maintained on glucose-yeast extract slants. On a weekly basis they were transferred to glycerol-cholesterol slants. The composition of both types of slants is shown in Table 1. After 3 days incubation at 30°C, the slants were stored in a cold room. Prior to use as an inoculum the culture was transferred back to glucose yeast extract slants. The culture was preserved by lyophilization (a procedure for preparing the culture in dry form by rapidly freezing and dehydrating it in the frozen state under high vacuum).

Table 1

Culture Media
1. Glucose-Yeast Extract

| | g. per liter |
|---|---|
| Glucose | 10 |
| Yeast extract | 10 |
| $K_2HPO_4$ | 1 |
| Salts A | 2 ml |
| Adjust to pH 7.0. | To make solid media. |
| Add 1.5% agar. | |

2. Glycerol-cholesterol

| | g. per liter |
|---|---|
| Glycerol | 5 |
| cholesterol | 1 |
| Tryptone (Difco) | 0.5 |
| $(NH_4)_2SO_4$ | 2 |
| $K_2HPO_4$ | 2 |
| Salts C | 10 ml |

When used for solid media cholesterol is first suspended in warm 0.1% polyvinyl alcohol, blended and then mixed with the above ingredients together with 1.5% agar.

| Salt Solution C | g/100 ml |
|---|---|
| $MgSO_4 \cdot 7H_2O$ | 2.5 |
| $MnSO_4 \cdot 7H_2O$ | 0.17 |
| $FeSO_4 \cdot 7H_2O$ | 0.28 |
| NaCl | 0.06 |
| $CaCl_2 \cdot H_2O$ | 0.01 |
| $ZnSO_4 \cdot 7H_2O$ | 0.006 |

| Salt Solution A | g/200 ml |
|---|---|
| $MgSO_4 \cdot 7H_2O$ | 20.0 |
| $FeSO_4 \cdot 7H_2O$ | 5 |
| $CaCl_2$ | 2 |
| $MnSO_4 \cdot H_2O$ | 0.2 |
| $NaMoO_4 \cdot 2H_2O$ | 0.1 |

EXAMPLE 2:

One Liter Batch Cultures

A loop from the nutrient slant, prepared by the method of Example 1, was used to inoculate 25 ml of glycerol-cholesterol medium without cholesterol (Table 1) in a 125 ml conical flask. After 24 hours shaking at 400 rpm, 30°C, this culture was used to inoculate 1 liter of glycerol-cholesterol medium in a Fernbach flask. The flask can be either narrow- or wide-mouthed. In most cases the incubation proceeds for 20 hours at 30°C with shaking at 150 rpm. The bacterial cells were collected by centrifugation.

After washing once in potassium phosphate, 0.05 M, pH 7.5, the cells were resuspended in the same buffer at a concentration of about 40 mg per ml (dry weight). This cell preparation retains enzyme activity for several days at 0° to 5°C. For long storage the preparation was either frozen or lyophilized. Enzyme in such cells is stable for at least 1 year. The usual yield of cells was 750 mg to 1000 mg per liter (dry weight).

EXAMPLE 3:

Enzyme Assay (To Determine Kinetics, etc.)

Cells (50 mg dry weight) were added to 5 ml water or to 5 ml of the cholesterol-alcohol-water suspension. Aliquots (1 ml) were withdrawn from each flask to be extracted as described below. The remaining mixture was incubated with shaking at 300 rpm, 30°C, for 1 hour at which time the entire contents were extracted and analyzed, along with the initial samples, for cholesterol by the modified Liebermann-Burchard method. Samples to be extracted were added to one-half volumes of absolute ethanol and two volumes of ether. These mixtures were shaken for 3 minutes in glass stoppered cylinders and set aside for separation of debris. Suitable aliquots were evaporated under nitrogen. The residue was taken up in acetic acid and then assayed for cholesterol.

The Liebermann-Burchard assay was modified from that described in Methods in Enzymology, page 392 (3) by extending the reaction time to 30 minutes and doing it in the dark at room temperature. Standard curves were made either with cholesterol or cholesteryl linoleate, depending upon which was to be assayed. Cholesterol oxidase activity was calculated in international units ($\mu$ moles cholesterol oxidized per minute at 30°C ph 7.5.)

EXAMPLE 4:

Growth Kinetics

The growth curve for the smooth strain of N. cholesterolicum in the glycerol medium without cholesterol is shown in FIG. 1. The smooth strain was used in this case because it makes a more homogenous culture. Cholesterol was left out of the medium because it interferred with turbidimetric measurement of growth. Growth reaches maximum in about 40 hours after a rather long log phase of about 14 hours. After maximum growth was attained considerable lysis occurs. The decrease in cholesterol was followed in parallel cultures grown in the complete medium with cholesterol. Cholesterol is nearly used up in 40 hours. At 20 hours about 30 percent remains. There was no loss of cholesterol owing to autooxidation or other processes in un-inoculated flasks.

One liter cultures of the smooth strain were grown in Fernbach flasks as described in Example 2. The glycerol-cholesterol medium was used to determine the cholesterol utilization. Growth was determined in the same medium without cholesterol. Growth was measured turbidimetrically. Cholesterol and cholesterol oxidase were determined as described in Example 3. Curve 1: cholesterol in uninoculated control. Curve 2: growth. Curve 3: pH value. Curve 4: cholesterol in inoculated medium. Curve 5: cholesterol oxidase activity.

EXAMPLE 5:

The Effect of Cholesterol in the Growth Medium

N. cholesterolicum was grown 24 hours in glycerol-cholesterol medium as described in Example 2. The cholesterol concentration was varied as shown. Cells were lyophilized and assayed for enzyme activity as described in Example 3. Cell weight was corrected for the amount of cholesterol present.

Table 2

Effect of Cholesterol Concentration On Production of Cholesterol Oxidase

| Test No. | Cholesterol % | Cells mg/l | IU/l | IU/g cells |
|---|---|---|---|---|
| 1 | 0.00 | 1060 | 0.07 | 0.07 |
| 2 | 0.01 | 1040 | 1.11 | 0.98 |
| 3 | 0.01 | 574 | 0.77 | 1.20 |
| 4 | 0.05 | 1000 | 1.50 | 1.50 |
| 5 | 0.10 | 894 | 2.58 | 2.90 |
| 6 | 0.10 | 474 | 3.76 | 4.21 |
| 7 | 0.10 | 1170 | 6.80 | 5.80 |
| 8 | 0.10 | 885 | 12.0 | 13.5 |
| 9 | 0.10 | 850 | 4.7 | 5.5 |
| 10 | 0.10 | 530 | 6.2 | 11.5 |
| 11 | 0.10 | 625 | 9.1 | 14.7 |

Very little oxidase is present in cells grown without cholesterol (Table 2). The amount of enzyme increased over 10 times when only 0.01% cholesterol is added. When 0.1% cholesterol was in the medium enzyme activity increased over 100 times (Table 2). The average specific activity in this case was 8.8 U/g cells compared to 0.07 U/g cells grown without cholesterol. No significant difference in the enzyme activities of smooth and rough strains was apparent.

EXAMPLE 6:

Induction of Cholesterol Oxidase

The inducing effects of three other substances, cholest-4-ene-3-one, cholesteryl linoleate, and cyclohexanol were investigated.

N. cholesterolicum was grown in the glycerol-cholesterol medium for 24 hours as described in Example 2 except that cholesterol was substituted by the inducers shown above. Enzyme was assayed as described in Example 3.

Cyclohexanol was ineffective, as an inducer, but both cholest-4-ene-3-one and the linoleate had significant activity (Table 3). Cholesteryl linoleate was slightly better than cholesterol at 0.05%. At the same concentration cholest-4-ene-3-one is about 1/2 as good as cholesterol.

Table 3

| Inducer | Cholesterol Oxidase Induction Concentration % | Cells mg/l | U/l | U/g cells |
|---|---|---|---|---|
| — | — | 1060 | 0.07 | 0.07 |
| cyclohexanol | 0.1 | 0 | 0 | 0 |
| cholesterol | 0.05 | 1000 | 1.5 | 1.5 |
| cholesteryl linoleate | 0.05 | 1490 | 2.0 | 2.9 |
| cholestenone (dispersed with surfactant) | 0.05 | 1920 | 1.8 | 0.96 |

EXAMPLE 7:

Effect of Substrate Preparation on Enzyme Assay

Cells were grown and prepared for assay as described in Example 2. Enzyme assay is described in Example 3. Suspensions were prepared as follows:

1. Cholesterol-alcohol-water. Cholesterol (1 g) was dissolved in 10 ml warm ethanol. Water (90 ml) was added to the alcohol solution with vigorous blending. Suspension was not as good if the order of addition was reversed.

2. Cholesteryl linoleate-ether-water. Cholesteryl linoleate (500 mg), dissolved in 5 ml ether, was added slowly to 100 ml hot water with vigorous stirring.

3. Cholesterol-PVA-water. Elvanol (PVA), medium viscosity, grade 52-22 (1 g) was dissolved in 100 ml water mixed with 0.5 ml 0.1 N HCl. Heating to 85°C was required. Cholesterol (500 mg) was added. Heating and stirring was continued 5 more minutes and then the mixture was blended vigorously for 5 minutes. Cholesteryl linoleate will make a similar suspension.

4. Cholesterol-DMF-water. Cholesterol (1 g) in 10 ml dimethylformamide (DMF) was added to 90 ml water.

5. Cholesterol-alcohol-Tween 80-water. These suspensions were made the same as No. 1 above except that a given amount of Tween 80 was added to water before mixing in cholesterol solution. Tween 80 is polyoxyethylene sorbitan monooleate and is manufactured by Atlas Chemical Industries.

TABLE 4

Cholesterol Oxidase Assay: Effect of Substrate Preparations

| Cell Preparation | Suspension | U/g cells |
|---|---|---|
| 1 | Cholesterol-alcohol-water | 12.9 |
|  | Cholesterol-DMF-water | 2.8 |
| 2 | Cholesterol-alcohol-water | 5.8 |
|  | Cholesterol-PVA-water | 14.9 |
| 3 | Cholesterol-alcohol-water | 1.1 |
|  | plus 0.02% Tween 80 | 2.1 |
|  | plus 0.1% Tween 80 | 2.0 |
|  | plus 0.25% Tween 80 | 1.0 |
| 4 | Cholesterol alcohol-water | 5.8 |
|  | Cholesteryl linoleate-alcohol-water | 30.7 |

This preliminary study with intact cells indicates that substrate preparation could affect enzyme activity substantially. Dimethylformamide (DMF) strongly inhibits enzyme activity, while poly(vinyl alcohol) stimulates. Surfactant apparently stimulates at low levels but becomes inhibitory at 0.25%. The most striking effect is shown by cholesteryl linoleate. In at least one case enzyme activity was increased about 5 times over the activity observed with a water suspension of cholesterol.

EXAMPLE 8:

Preparation of Cholesterol Oxidase in a Laboratory Fermentor

A Chemapec Laboratory 20-liter fermentor was charged with 14 liters of the glycerol-cholesterol medium. Cholesterol (15 g) was sonified for 15 minutes in 200 ml water before it was added. Antifoam (4 ml Dow Polyglycol P-2000) was added before sterilization of the fermentor and contents. The fermentor was inoculated with a 1-liter culture of *N. cholesterolicum* grown as previously described in the glycerol-cholesterol medium. The draft tube aeration system was used at 1000 rpm, 0.25 VVM. Temperature was 30°C. The pH value was controlled at 6.8 with 2M KOH.

The initial dissolved oxygen (DO) of 100% falls gradually to 77% in 24 hours at which time the fermentation was stopped. Foaming was light but nevertheless a considerable amount of cholesterol and bacterial cells accumulate on the vessel walls just above the liquid level. This may have reduced enzyme yield somewhat. Cells were harvested by conventional centrifugation.

EXAMPLE 9:

Isolation and Purification of Cholesterol Oxidase

Advantageously, cells containing the enzyme can be frozen and thawed. This process apparently unmasks some enzyme activity. It is now possible to prepare large quantities of active cells and preserve them for work up when convenient. It also is possible to break the cells by sonifying. After this treatment, the activity was found in the 17,000 × G pellet. The activity of the enzyme obtained by these procedures is summarized in Table 5. Although the data is not included in the Table, it was found that this pellet was stable to freezing and thawing as well as further sonic treatment.

Table 5

Studies Preliminary to Enzyme Purification

| Operation | U/g cells |
|---|---|
| Fresh cells | 4.2 |
| Frozen, thawed, blended | 10.0 |
| Fresh | 2.8 |
| Frozen, thawed, blended | 5.5 |
| Sonify 3 minutes | 6.2 |
| 17,000 G pellet | 10.3 |
| 17,000 G supernatent | 0.0 |

EXAMPLE 10

Cells were prepared and assayed with cholesterol-ethanol-water suspension as described previously. Sonification was accomplished with a Branson Model S75. The sample was in an ice bath during treatment.

Purification is achieved by sonification for 10 minutes and centrifuging at 17,000 × G for 15 minutes. The 27,000 G pellet is resuspended in 50 mM potassium phosphate buffer, pH 7.5 and deoxycholate added. The tubes are kept at 0°C for 15 minutes then centrifuged at 27,000 × G for 15 minutes. Supernatants are assayed by the method described in Example 3. Protein is determined by the Biuret method.

While the invention has been described in detail with particular reference to preferred embodiments thereof, it will be understood that variations and modifications can be effected within the spirit and scope of the invention.

We claim:

1. A process for preparing a cholesterol oxidase enzyme comprising the step of growing the bacterium *Nocardia cholesterolicum* species NRRL 5767 or NRRL 5768 in an aqueous medium comprising a primary carbon source and a secondary carbon source selected from the group consisting of cholesterol, cholest-4-ene-3-one, and cholesteryl linoleate.

2. The process of claim 1 wherein the concentration of said secondary carbon source in said medium ranges from about 0.05% to about 0.5%.

3. The process of claim 2 wherein the pH of said medium ranges from about 5.0 to about 8.0.

4. The process of claim 3 wherein the temperature of said medium is maintained at betweeen about 24° and about 35°C and growth is carried out for a period of between about 18 and about 40 hours.

5. The process of claim 2 wherein said primary carbon source is selected from the group consisting of acetic acid, glucose and glycerol.

6. The process of claim 5 wherein said secondary carbon source is cholesterol.

7. The process of claim 6 wherein said primary carbon source is glycerol.

8. the process of claim 5 wherein the concentration of said secondary carbon source ranges from about 0.1 to about 0.2% by weight.

9. The process of claim 4 wherein said secondary carbon source is suspended in a mixture of water and a watermiscible solvent for said secondary carbon source.

* * * * *